(12) United States Patent
Denny et al.

(10) Patent No.: US 12,619,965 B2
(45) Date of Patent: May 5, 2026

(54) COMBINED SHUTTER AND USER INTERFACE PIN ENTRY

(71) Applicant: NCR Atleos Corporation, Atlanta, GA (US)

(72) Inventors: Ian M. Denny, Perth (GB); Andrew Robert Grant, Dunblane (GB)

(73) Assignee: NCR Atleos Corporation, Atlanta, GA (US)

( * ) Notice: Subject to any disclaimer, the term of this patent is extended or adjusted under 35 U.S.C. 154(b) by 23 days.

(21) Appl. No.: 18/397,350

(22) Filed: Dec. 27, 2023

(65) Prior Publication Data

US 2024/0127207 A1 Apr. 18, 2024

Related U.S. Application Data

(62) Division of application No. 15/444,240, filed on Feb. 27, 2017, now Pat. No. 11,961,058.

(51) Int. Cl.

| | |
|---|---|
| *G06Q 20/10* | (2012.01) |
| *G06K 7/10* | (2006.01) |
| *G06Q 20/40* | (2012.01) |
| *G07D 11/14* | (2019.01) |
| *G07D 11/60* | (2019.01) |
| *G07F 7/10* | (2006.01) |
| *G07F 19/00* | (2006.01) |

(52) U.S. Cl.
CPC ..... *G06Q 20/1085* (2013.01); *G06K 7/10297* (2013.01); *G06Q 20/4012* (2013.01); *G07D 11/14* (2019.01); *G07D 11/60* (2019.01); *G07F 7/1033* (2013.01); *G07F 19/203* (2013.01); *G07F 19/2055* (2013.01)

(58) Field of Classification Search
CPC .................................................. G06Q 20/1085
USPC ............................................................ 705/43
See application file for complete search history.

(56) References Cited

U.S. PATENT DOCUMENTS

| | | | | |
|---|---|---|---|---|
| 4,953,086 | A * | 8/1990 | Fukatsu | G07F 19/20 |
| | | | | 705/42 |
| 9,349,259 | B1 | 5/2016 | Denny et al. | |
| 9,470,030 | B2 | 10/2016 | Denny | |
| 10,089,501 | B2 | 10/2018 | Leiponis et al. | |
| 10,553,082 | B2 | 2/2020 | Brush | |
| 2003/0084170 | A1 | 5/2003 | deJong et al. | |
| 2005/0287853 | A1 * | 12/2005 | Kim | H01R 13/453 |
| | | | | 439/137 |
| 2007/0098224 | A1 * | 5/2007 | Morita | G06F 21/608 |
| | | | | 340/5.2 |

(Continued)

OTHER PUBLICATIONS

"U.S. Appl. No. 15/444,240, Advisory Action mailed Aug. 23, 2022", 3 pgs.

(Continued)

*Primary Examiner* — John W Hayes
*Assistant Examiner* — Cristina Owen Sherr
(74) *Attorney, Agent, or Firm* — Schwegman Lundberg & Woessner, P.A.

(57) ABSTRACT

Examples of a system and method for transacting media at a self-service terminal (SST), are generally described. A method may include receiving a PIN on a user interface component of a media interface aperture cover. The method may include causing the media interface aperture cover to retract to dispense or receive media through a media interface aperture.

20 Claims, 5 Drawing Sheets

(56) References Cited

U.S. PATENT DOCUMENTS

| | | | | |
|---|---|---|---|---|
| 2008/0254862 | A1* | 10/2008 | Mattice | G07F 17/3216 |
| | | | | 463/25 |
| 2010/0188326 | A1* | 7/2010 | Dines | G06F 3/033 |
| | | | | 345/156 |
| 2011/0006112 | A1 | 1/2011 | Mueller | |
| 2012/0035989 | A1 | 2/2012 | Abel et al. | |
| 2012/0242498 | A1* | 9/2012 | Ree | G01D 4/002 |
| | | | | 324/110 |
| 2014/0158768 | A1 | 6/2014 | Ray et al. | |
| 2014/0166744 | A1* | 6/2014 | Crews | G07F 19/211 |
| | | | | 235/379 |
| 2016/0110967 | A1 | 4/2016 | Jenkins et al. | |
| 2017/0308877 | A1* | 10/2017 | Cha | G07F 9/009 |

OTHER PUBLICATIONS

"U.S. Appl. No. 15/444,240, Decision on Pre-Appeal Brief Request mailed Aug. 17, 2023", 2 pgs.

"U.S. Appl. No. 15/444,240, Final Office Action mailed Mar. 29, 2023", 11 pgs.

"U.S. Appl. No. 15/444,240, Final Office Action mailed May 26, 2021", 12 pgs.

"U.S. Appl. No. 15/444,240, Final Office Action mailed Jun. 6, 2022", 11 pgs.

"U.S. Appl. No. 15/444,240, Non Final Office Action mailed Oct. 27, 2020", 10 pgs.

"U.S. Appl. No. 15/444,240, Non Final Office Action mailed Dec. 6, 2022", 10 pgs.

"U.S. Appl. No. 15/444,240, Non Final Office Action mailed Dec. 23, 2021", 10 pgs.

"U.S. Appl. No. 15/444,240, Notice of Allowance mailed Dec. 15, 2023", 9 pgs.

"U.S. Appl. No. 15/444,240, Pre-Appeal Brief Request filed Jun. 28, 2023", 5 pgs.

"U.S. Appl. No. 15/444,240, Response filed Jan. 27, 2021 to Non Final Office Action mailed Oct. 27, 2020", 8 pgs.

"U.S. Appl. No. 15/444,240, Response filed Mar. 6, 2023 to Non Final Office Action mailed Dec. 6, 2022", 8 pgs.

"U.S. Appl. No. 15/444,240, Response filed Mar. 23, 2022 to Non Final Office Action mailed Dec. 23, 2021", 8 pgs.

"U.S. Appl. No. 15/444,240, Response filed Jul. 10, 2020 to Restriction Requirement mailed Apr. 20, 2020", 6 pgs.

"U.S. Appl. No. 15/444,240, Response filed Jul. 26, 2021 to Final Office Action mailed May 26, 2021", 8 pgs.

"U.S. Appl. No. 15/444,240, Response filed Aug. 5, 2022 to Final Office Action mailed Jun. 6, 2022", 8 pgs.

"U.S. Appl. No. 15/444,240, Response filed Sep. 6, 2022 to Advisory Action mailed Aug. 23, 2022", 8 pgs.

"U.S. Appl. No. 15/444,240, Restriction Requirement mailed Apr. 20, 2020", 6 pgs.

* cited by examiner

400

402

RECEIVE AN INDICATION FROM A USER INCLUDING INSTRUCTIONS, FOR EXAMPLE TO DISPENSE OR RECEIVE MEDIA

404

RECEIVE A PIN ON A USER INTERFACE COMPONENT OF A SHUTTER COVER

406

CAUSE THE SHUTTER COVER TO RETRACT TO DISPENSE OR RECEIVE MEDIA

500

502

508

510

PROCESSOR

524

INSTRUCTIONS

DISPLAY DEVICE

504

MAIN MEMORY

524

INSTRUCTIONS

512

INPUT DEVICE

506

STATIC MEMORY

524

INSTRUCTIONS

514

UI NAVIGATION DEVICE

521

SENSOR(S)

516

MASS STORAGE

522

MACHINE-READABLE MEDIUM

524

INSTRUCT.

520

NETWORK INTERFACE DEVICE

INTERLINK

518

SIGNAL GENERATION DEVICE

526

NETWORK

528

OUTPUT CONTROLLER

COMBINED SHUTTER AND USER INTERFACE PIN ENTRY

CROSS-REFERENCE TO RELATED APPLICATION

This application is a division of U.S. patent application Ser. No. 15/444,240, filed Feb. 27, 2017, which application and publication is incorporated herein by reference in its entirety.

BACKGROUND

Machines that dispense or receive media are often limited by space and legal constraints. Current designs for these types of machines may not fit within legal limits, such as laws related to providing accessible machines for those with disabilities. If a machine in a certain location does not comply with these legal limits, a second dedicated machine may be required. To comply with these legal rules, machines are designed with small display screens.

Personal Identification Number (PIN) pad or keyboard skimmers are used by hackers and identity thieves to steal PIN information at self-service terminals. The skimmers intercept entered PINs and send the PINs to the hackers or identity thieves. Some systems use a touchscreen to attempt to avoid this issue, but touchscreens may reveal traces of oil or other identifying marks from where numbers are entered on the touchscreen.

SUMMARY

In various embodiments, methods and systems for transacting media from a self-service terminal (SST) are presented.

According to an embodiment, an SST may include a media conveyor and a media interface aperture cover including a user interface component. According to an embodiment, a method may include receiving a Personal Identification Number (PIN) on a user interface component of a media interface aperture cover and causing the media interface aperture cover to retract to dispense or receive media through a media interface aperture.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Systems and methods described herein make use of a combined media interface aperture cover and user interface component of a recycler or other self-service terminal (SST), such as an automated teller machine (ATM). A recycler is used to perform media handling, such as transactions with cash, to accept deposits or dispense withdrawals of the media. In an example, the recycler accepts cash and adds to existing stock of cash by storing the cash, for example in cassettes within the recycler. When a withdrawal is requested, the recycler dispenses cash from the stock (e.g., from cassettes). The cash is dispensed or received by a media conveyor via a media interface aperture of a cash transaction component. The cash transaction component includes a media interface aperture cover that covers the media interface aperture. The media interface aperture cover is normally closed and opens to dispense or receive cash when a customer requests, is authorized, or is validated to receive or deposit the cash. The cash transaction component includes a user interface component, such as a display screen, encrypted touch screen, Personal Identification Number (PIN) pad, etc.

Previous recyclers included separate media interface aperture covers and PIN pads. While functional, separating the media interface aperture cover and PIN pad require additional depth space and limit display size for a display screen of the recycler. The display screen is typically positioned above the PIN pad, which in turn is typically above the media interface aperture cover. This is described in more detail below with respect to FIG. 1.

The present systems and methods include a combined media interface aperture cover and user interface component. The user interface component may be applied on top of the media interface aperture cover, embedded into the media interface aperture cover, integrated with the media interface aperture cover, etc. The combined media interface aperture cover and user interface component are described in additional detail below. While the discussion related to FIGS. 1 and 2 refer to a recycler, other SST devices may be used with the combined media interface aperture cover and user interface component, such as an ATM, an interactive teller machine (ITM), point of sale (POS) device, kiosk, or the like.

Figure 1:
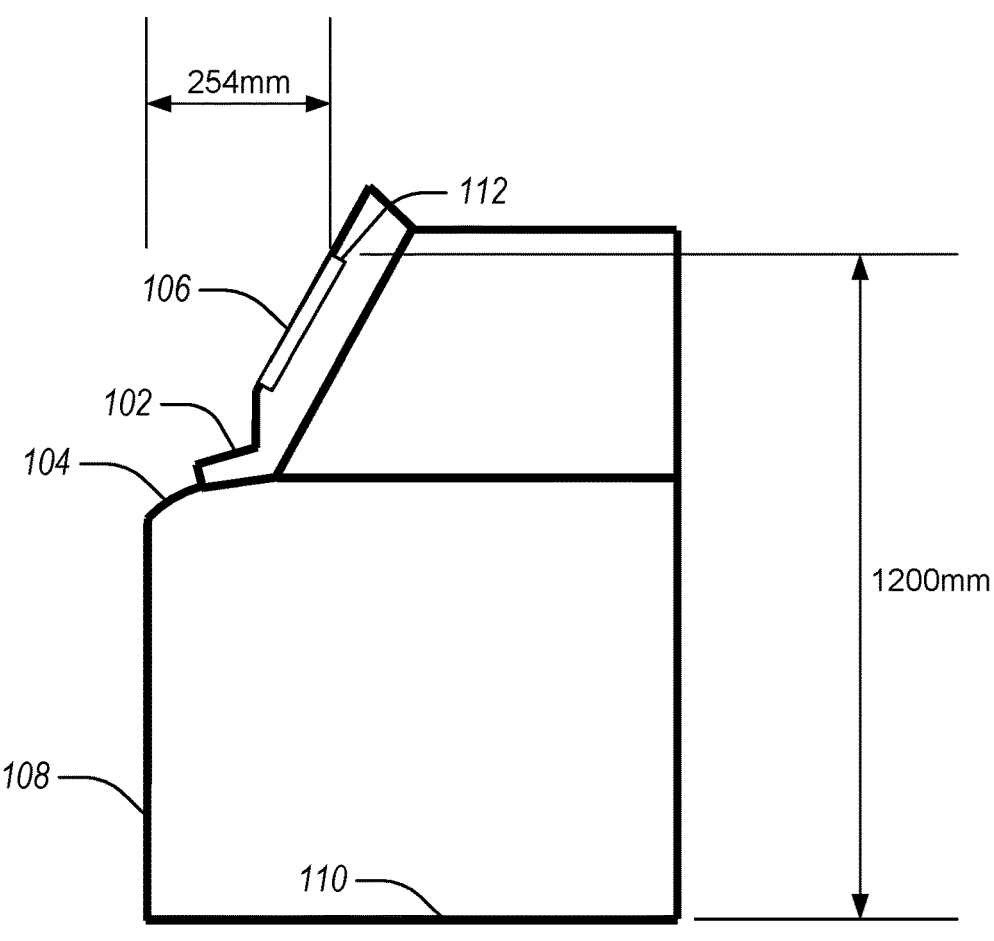
FIG. 1 illustrates generally a recycler including separate PIN pad and media interface aperture cover in accordance with some embodiments.

FIG. 1 illustrates generally a recycler 100 including a distinct PIN pad 102 and a media interface aperture cover or shutter 104 in accordance with some embodiments. The recycler includes example maximum dimensions including a depth distance from a top side 112 of a display screen 106 to a front side 108 of the recycler (254 millimeters) and a height distance from the top side 112 to a bottom side 110 of the recycler (1200 millimeters). These dimensions are provided as an example of legal requirements for complying with accessibility laws, such as those intended to allow users with disabilities (e.g., disabilities requiring confinement to a wheelchair) to easily access the recycler 100. Other values may be substituted for different jurisdictions.

The display screen 106 is limited in size by both the depth distance and the height distance. For example, extending the top side 112 of the display screen 106 would put the top side 112 further away from the front side 108 of the recycler 100 than 254 mm and the bottom side 110 of the recycler 100 than 1200 mm. A bottom side of the display screen 106 is limited by the PIN pad 102. The PIN pad 102 is limited by the shutter 104. The PIN pad 102 may hang over a part of the shutter 104 or a part of a media transaction component including the shutter 104. The limit of the overhang of the PIN pad 102 is the usefulness of dispensing media from a media conveyor via a shutter aperture covered by the shutter. Thus, even with some overhang, the lowest limit of the depth of the PIN pad 102 and the shutter 104 combined remains greater than the depth of either one individually, thus limiting the size of the display screen 106 when complying with accessibility rules.

Figure 2:
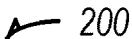
FIG. 2 illustrates generally a recycler including a combined media interface aperture cover and user interface component in accordance with some embodiments.
Figure 2:
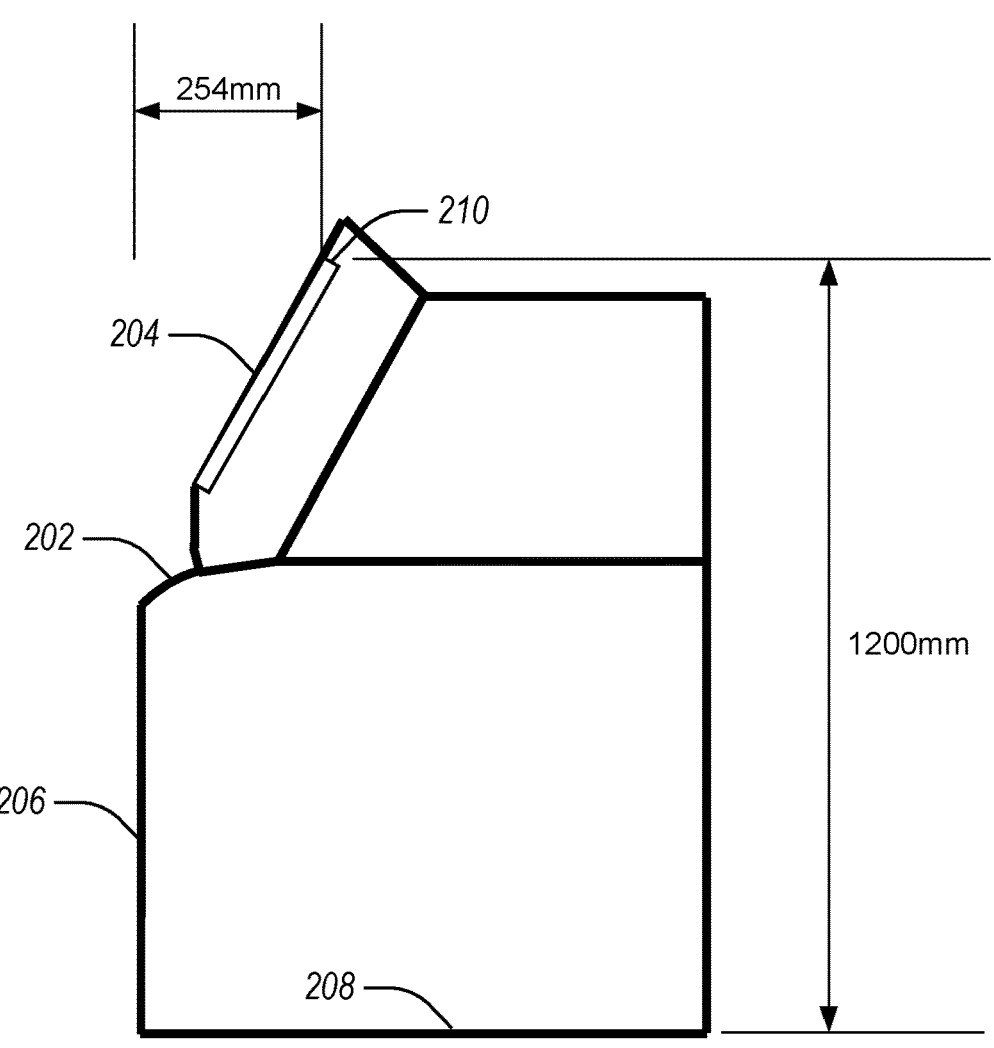

FIG. 2 illustrates generally a recycler 200 including a combined shutter and user interface component in accordance with some embodiments. The combined shutter and user interface component may be referred to together as a media transaction component 202. The recycler 200 includes a display screen 204 including a top side 210. Depth distance and height distance may be measured from the top side 210 to a front side 206 of the recycler 200 and a bottom side 208 of the recycler 200 respectively. The depth distance and the height distance may be limited by laws or other accessibility regulations. By combining the shutter and user interface component into the media transaction component 202, the display screen 204 may be larger than, for example display screen 106 of FIG. 1, while maintaining the depth distance of 254 mm or less and the height distance of 1200 mm or less.

In an example, the display screen 204 may be of a similar size to the display screen 106, and the display screen 204 will be more accessible at a shorter depth and lower height than the display screen 106 due to the combination of shutter and user interface component in the media transaction component 202. In another example, the display screen 106 may be limited to displaying user interactive elements below a particular threshold height of the screen due to exceeding the depth or height limit, and the display screen 204 may allow for display of user interactive elements on the entirety of the display screen 204, while complying with the depth or height limit. In an example, combining the shutter and the user interface component in the recycler 200 may allow 100 mm of depth to be eliminated from the design of the recycler 100 of FIG. 1. In an example, an additional interactive interface may be added to recycler 200 based on the additional depth added by combining the shutter and the user interface component in the media transaction component 202.

In an example the display screen 204 may be at a 60 degree angle from a horizontal. For example, the angle of display of the display screen 204 may be such that it is visible from a seated position or a standing position.

Figure 3A:
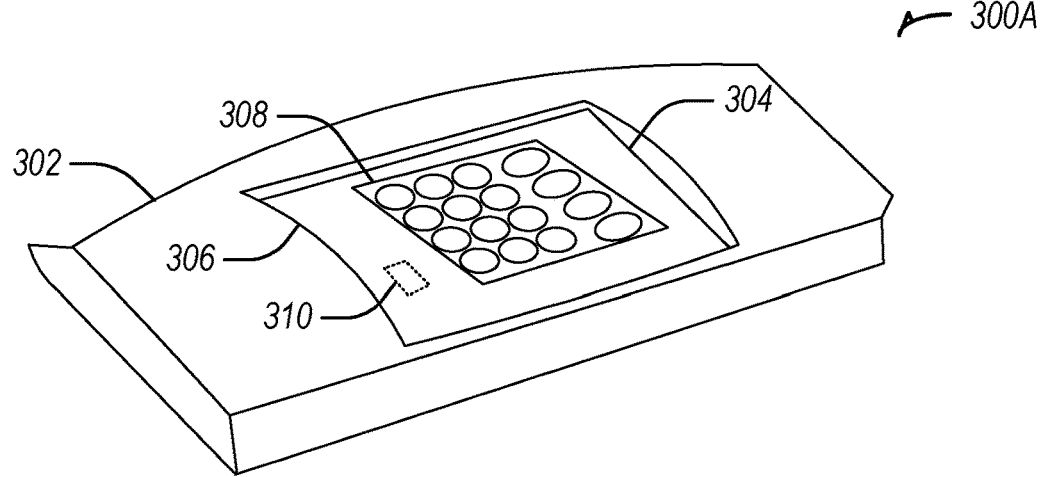
FIGS. 3A-3C illustrate generally example media transaction components in accordance with some embodiments.
Figure 3B:
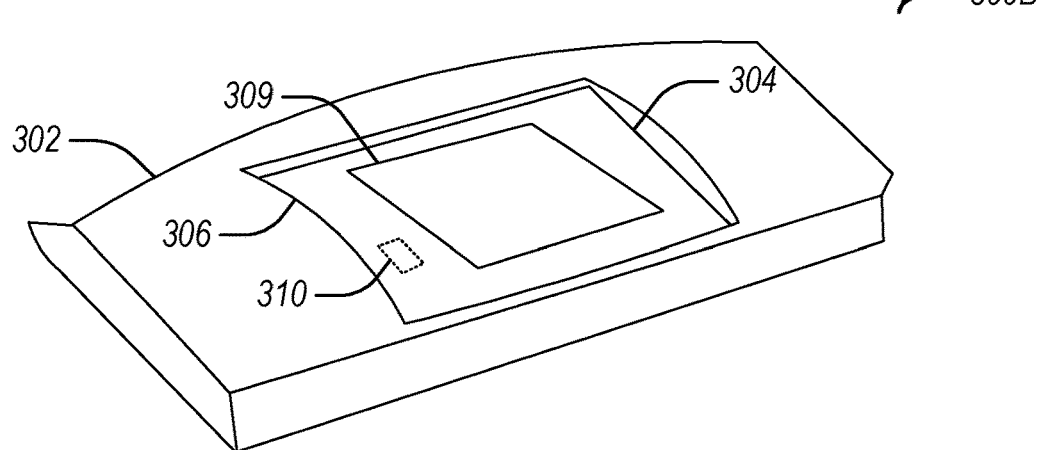
Figure 3C:
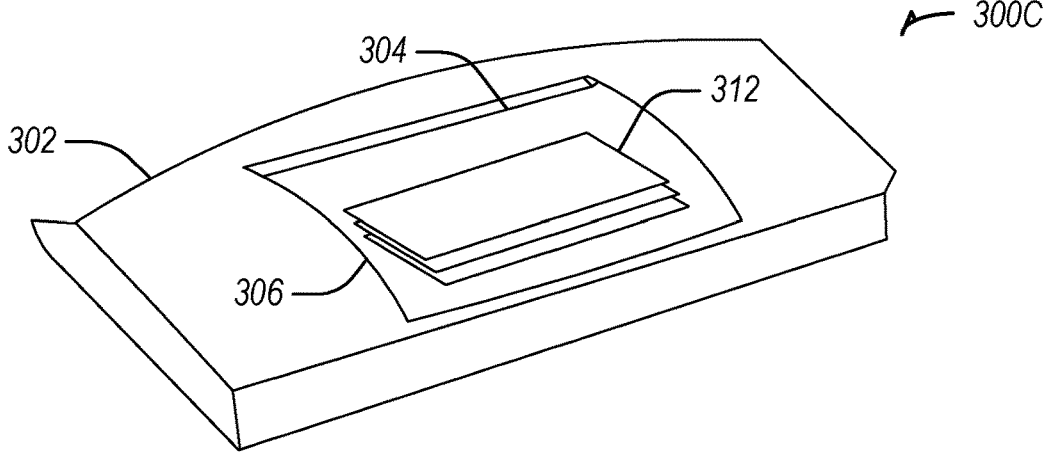

FIGS. 3A-3C illustrate generally example media transaction components 300A-300C in accordance with some embodiments. The media transaction components 300A-300C include a housing 302 and a shutter 304 that covers a shutter aperture 306. The media transaction components 300A-300C are shown as examples and may be combined or rearranged, such as by including different aspects of a user interface from one or more of the examples.

The media transaction component 300A includes a PIN pad user interface 308 that may be connected to, be embedded in, or replace part of the shutter 304. The PIN pad user interface 308 includes individual buttons in a pad formation, such as a keypad or number pad. The PIN pad user interface 308 may include additional physical keys, buttons or touch options (e.g., on a touch screen), such as to select, enter, cancel, etc.

In an example, the PIN pad user interface 308 may be embedded in the shutter 304 such that the buttons on the PIN pad user interface 308 clear the housing 302 when the shutter 304 retracts or covers the shutter aperture 306. For example, when combined with the shutter, the PIN pad user interface 308 may be 10 mm thick or less. A low profile (e.g., small thickness) may allow the PIN pad user interface 308 to clear the housing 302. The recessed or embedded (e.g., on a touch screen) may allow the shutter 304 to keep a tight seal with the housing 302, while allowing the PIN pad user interface 308 to traverse the housing 302.

By integrating or overlaying the PIN pad user interface 308 with the shutter 304, the media transaction component 300A may prevent PIN pad or keyboard skimmers from being added on top of the PIN pad user interface 308. For example, a PIN pad skimmer applied by a hacker or identity thief onto the PIN pad user interface 308 may prevent the shutter 304 from opening when the PIN pad skimmer comes into contact with the housing 302. A SST including the media transaction component 300A may perform security steps when this occurs. For example, if the shutter 304 cannot open due to the PIN pad skimmer, the SST may abort the transaction, alert a user that the PIN may be stolen, alert the police, alert credit bureaus, or the like. In an example, the housing 302 may be configured to knock off or disengage the PIN pad skimmer when they contact each other, while allowing the shutter 304 to open. This may allow the PIN pad skimmer to fall into the shutter aperture 306, where it may be stored for retrieval by the police or other authorities.

The media transaction component 300A may include a reader 310, such as a near field communication (NFC) reader, a radio frequency identification (RFID) reader, Bluetooth, or other type of passive or active proximity communication component. The reader may be used to authenticate a user electronically, such as without a PIN or to supplement the security of a PIN. For example, a user may place a mobile device (e.g., cell phone) near the reader 310 to verify the user. The reader 310 may be integrated into the shutter 304 or may be affixed to the shutter 304 (e.g., on a top side or a bottom side of the shutter 304). In another example, the reader 310 may be embedded in or affixed to the PIN pad user interface 308. In an example, the reader 310 may replace or supplement the PIN pad user interface 308.

In an example, the shutter 304 or the PIN pad user interface 308 may be made of cast metal. The PIN pad user interface 308 may be connected to a processor via flexible cables or a socket that allow movement of the flexible cables or the socket.

The media transaction component 300B includes a display screen user interface 309 that may be connected to, be embedded in, or replace part of the shutter 304. The display screen user interface 309 may include a touchscreen or a touchscreen component, and may display options, such as to electronically enter a PIN number, as well as options to confirm, cancel, or navigate menus. The display screen user interface 309 may include a glass surface facing outward towards a user. The shutter 304 including the display screen user interface 309 may cover the shutter aperture 306. The media transaction component 300B may include the reader 310, as described above. The reader 310 may supplement or replace the display screen user interface 309.

The display screen user interface 309 combined with the shutter 304 may be used to prevent identity theft. For example, some identity thieves monitor residue on a touchscreen to attempt to steal a PIN number, the residue is usually left behind by a user pressing PIN numbers on the touch screen from oil in the skin of the user. Then, the identity thieves may know the PIN number (although they may not know the correct order). The housing 302 may be used to wipe down the display screen user interface 309 when the shutter 304 retracts or returns to cover the shutter aperture 306. By wiping the display screen user interface 309 clean, the reside may be removed, preventing this identity theft technique. This wiping by the housing 302 may be used to clean the display screen user interface 309, such as to prevent spreading disease. The display screen user interface 309 may be connected to a processor via flexible cables or a socket that allow movement of the flexible cables or the socket.

The media transaction component 300C illustrates either example media transaction component 300A or 300B, when the shutter 304 is retracted to allow the shutter aperture 306 to be open. Since the PIN pad user interface 308 of media transaction component 300A and the display screen user interface 309 of media transaction component 300B are embedded in, connected to, affixed to, or otherwise combined with the shutter 304, when the shutter 304 is retracted, the PIN pad user interface 308 and the display screen user interface 309 may not be visible or may be disabled. The media transaction component 300C includes a media conveyor 312 to dispense or receive media, such as cash via the shutter aperture 306. In an example, the shutter 304 may open in response to receiving a correct PIN via the PIN pad user interface 308, the display screen user interface 309, or via the reader 310, or in response to selection being made on a display screen (not shown) of a SST including the housing 302 (e.g., a selection made after the PIN is entered).

Figure 4:
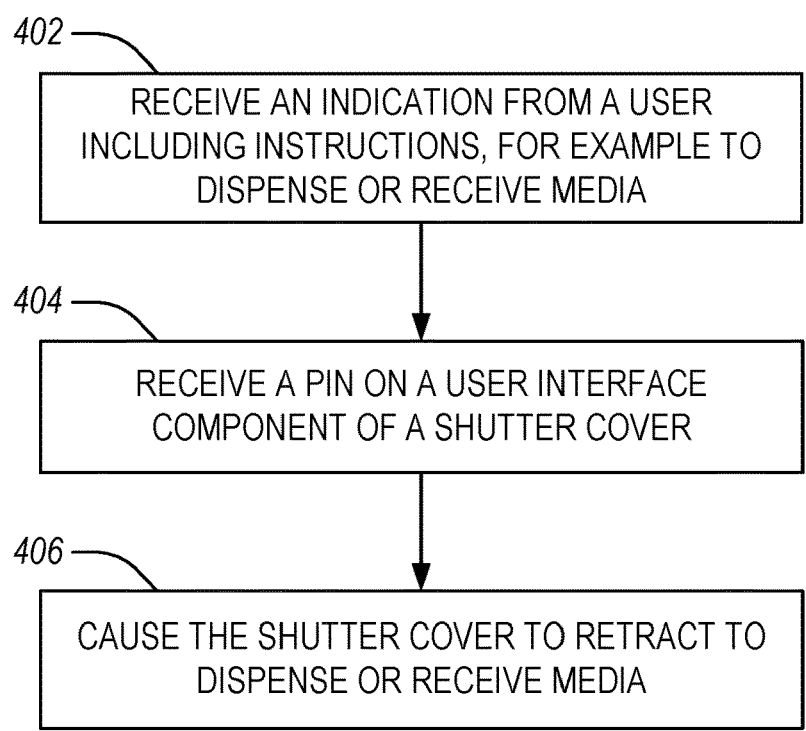
FIG. 4 illustrates generally a flowchart showing a technique for transacting media from a self-service terminal (SST) in accordance with some embodiments.

FIG. 4 illustrates generally a flowchart showing a technique 400 for transacting media from a SST in accordance with some embodiments. In an example, the SST is a recycler, an ATM, an ITM, a POS, a kiosk, or the like. The technique 400 includes an operation 402 to receive an indication from a user including instructions, such as to dispense or receive media, such as cash. The indication may be received on a display screen, such as on a mobile device or on a display screen of the SST.

The technique 400 includes an operation 404 to receive a PIN on a user interface component of a media interface aperture cover. In an example, the PIN may be received after prompting the user, such as audibly or on a display screen, to enter a PIN on the user interface component of the shutter cover. In an example, the PIN may be received at a processor. The technique 400 includes an operation 406 to cause the media interface aperture cover to retract to dispense or receive media. The media interface aperture cover may be caused to retract using the processor.

The technique 400 may include an optional operation to disable the user interface component when the media interface aperture cover retracts. In another example, the user interface component may become hidden or inaccessible when the media interface aperture cover retracts, effectively disabling the user interface component. The technique 400 may include an optional operation to cause an encrypted touch screen of the user interface component to be wiped clean by the SST, such as by a housing or other aspect of a media transaction component, when the media interface aperture cover retracts or reengages to open or cover respectively, a media interface aperture.

Figure 5:
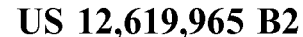
FIG. 5 illustrates generally an example of a block diagram of a machine upon which any one or more of the techniques discussed herein may perform in accordance with some embodiments.

FIG. 5 illustrates generally an example of a block diagram of a machine 500 upon which any one or more of the techniques discussed herein may perform in accordance with some embodiments. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, alphanumeric input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 that is non-transitory on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

VARIOUS NOTES & EXAMPLES

Each of these non-limiting examples may stand on its own, or may be combined in various permutations or combinations with one or more of the other examples.

Example 1 is a self-service terminal (SST) defining a media interface aperture and comprising: a media conveyor to transport media received through the media interface aperture; and a media interface aperture cover including a user interface component.

In Example 2, the subject matter of Example 1 optionally includes wherein the user interface component is embedded in the media interface aperture cover.

In Example 3, the subject matter of any one or more of Examples 1-2 optionally include wherein the SST is a recycler.

In Example 4, the subject matter of any one or more of Examples 1-3 optionally include wherein the SST is an automated teller machine (ATM).

In Example 5, the subject matter of any one or more of Examples 1-4 optionally include wherein the media conveyor includes a media handling component to process the media received through the media interface aperture.

In Example 6, the subject matter of any one or more of Examples 1-5 optionally include wherein the user interface component includes an encrypted PIN pad.

In Example 7, the subject matter of any one or more of Examples 1-6 optionally include wherein the user interface component includes an encrypted touch screen.

In Example 8, the subject matter of Example 7 optionally includes wherein the media interface aperture cover is configured to retract and wherein the encrypted touch screen is configured to be wiped clean by the media transaction component when the media interface aperture cover retracts.

In Example 9, the subject matter of any one or more of Examples 1-8 optionally include wherein the media transaction component includes an near field communication (NFC) reader.

In Example 10, the subject matter of any one or more of Examples 1-9 optionally include wherein the SST further comprises a display screen that is larger than 15 inches.

In Example 11, the subject matter of Example 10 optionally includes wherein a top most portion of the display screen is 254 millimeters or less from a front edge of the SST.

In Example 12, the subject matter of any one or more of Examples 10-11 optionally include wherein the top most portion of the display screen is 1200 millimeters or less from a bottom edge of the SST.

In Example 13, the subject matter of any one or more of Examples 1-12 optionally include wherein, when the media interface aperture cover retracts, the user interface component is hidden or unusable.

Example 14 is a method for transacting media from a self-service terminal (SST) comprising: receiving, on a display screen, an indication from a user including instructions to dispense or receive media; prompting the user on the display screen to enter a PIN on a user interface component of a media interface aperture cover; receiving, at a processor, the PIN on the user interface component; and causing, by the processor, the media interface aperture cover to retract to dispense or receive media through a media interface aperture of the SST.

In Example 15, the subject matter of Example 14 optionally includes disabling the user interface component when the media interface aperture cover retracts.

In Example 16, the subject matter of any one or more of Examples 14-15 optionally include wherein the SST is a recycler.

In Example 17, the subject matter of any one or more of Examples 14-16 optionally include causing an encrypted touch screen of the user interface component to be wiped clean by the SST when the shutter cover retracts.

Example 18 is a method for transacting media from a self-service terminal (SST) comprising: receiving, at a processor, a PIN on a user interface component of a media interface aperture cover; and causing, by the processor, the media interface aperture cover to retract to dispense or receive media through a media interface aperture of the SST.

In Example 19, the subject matter of Example 18 optionally includes wherein the SST is a recycler.

In Example 20, the subject matter of any one or more of Examples 18-19 optionally include disabling the user interface component when the media interface aperture cover retracts.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method for transacting media from a self-service terminal (SST) comprising:

receiving, on a display screen, an indication from a user including instructions to dispense or receive media;

prompting the user on the display screen to enter a PIN on a user interface component physically integrated into a media interface aperture cover;

receiving, at a processor, the PIN via the user interface component;

retracting, by the processor, the media interface aperture cover from a position covering a media interface aperture to a position to allow media to be dispensed or received through the media interface aperture of the SST; and dispensing or receiving media through the media interface aperture of the SST in response to the media interface aperture cover retracting.

2. The method of claim 1, further comprising disabling the user interface component when the media interface aperture cover retracts.

3. The method of claim 1, wherein the SST is a recycler.

4. The method of claim 1, further comprising causing an encrypted touch screen of the user interface component to be wiped clean by the SST.

5. The method of claim 4, wherein the encrypted touch screen is wiped clean by a housing of a media transaction component when the media interface aperture cover retracts to open the media interface aperture.

6. The method of claim 4, wherein the encrypted touch screen is wiped clean by a housing of a media transaction component when the media interface aperture cover reengages to cover the media interface aperture.

7. The method of claim 1, wherein the SST is an automated teller machine (ATM).

8. The method of claim 1, wherein the media is cash.

9. The method of claim 1, wherein the display screen is on the SST.

10. The method of claim 1, wherein prompting the user includes playing audio.

11. The method of claim 1, wherein causing the media interface aperture cover to retract includes causing the user interface component to become hidden or inaccessible.

12. At least one non-transitory machine-readable medium including instructions for transacting media from a self-service terminal (SST), which when executed by processing circuitry causes the processing circuitry to perform operations comprising:

receiving, via a display screen, an indication from a user including instructions to dispense or receive media;

prompting the user on the display screen to enter a PIN on a user interface component physically integrated into a media interface aperture cover;

receiving the PIN via the user interface component;

retracting the media interface aperture cover from a position covering a media interface aperture to a position to allow media to be dispensed or received through the media interface aperture of the SST; and dispensing or receiving media through the media interface aperture of the SST in response to the media interface aperture cover retracting.

13. The at least one non-transitory machine-readable medium of claim 12, wherein the instructions further comprise disabling the user interface component when the media interface aperture cover retracts.

14. The at least one non-transitory machine-readable medium of claim 12, wherein the SST is a recycler.

15. The at least one non-transitory machine-readable medium of claim 12, wherein the instructions further comprise causing an encrypted touch screen of the user interface component to be wiped clean by the SST.

16. The at least one non-transitory machine-readable medium of claim 12, wherein the SST is an automated teller machine (ATM).

17. The at least one non-transitory machine-readable medium of claim 12, wherein the media is cash.

18. The at least one non-transitory machine-readable medium of claim 12, wherein the display screen is on the SST.

19. The at least one non-transitory machine-readable medium of claim 12, wherein causing the media interface aperture cover to retract includes causing the user interface component to become hidden or inaccessible.

20. An apparatus comprising:

means for receiving, via a display screen, an indication from a user including instructions to dispense or receive media;

means for prompting the user on the display screen to enter a PIN on a user interface component physically integrated into a media interface aperture cover;

means for receiving the PIN via the user interface component;

means for retracting the media interface aperture cover from a position covering a media interface aperture to a position to allow media to be dispensed or received through the media interface aperture of the apparatus; and means for dispensing or receiving media through the media interface aperture of the apparatus in response to the media interface aperture cover retracting.

* * * * *